Dec. 19, 1933.  C. C. FARMER  1,939,845
BRAKE CYLINDER PROTECTOR
Filed Nov. 9, 1928
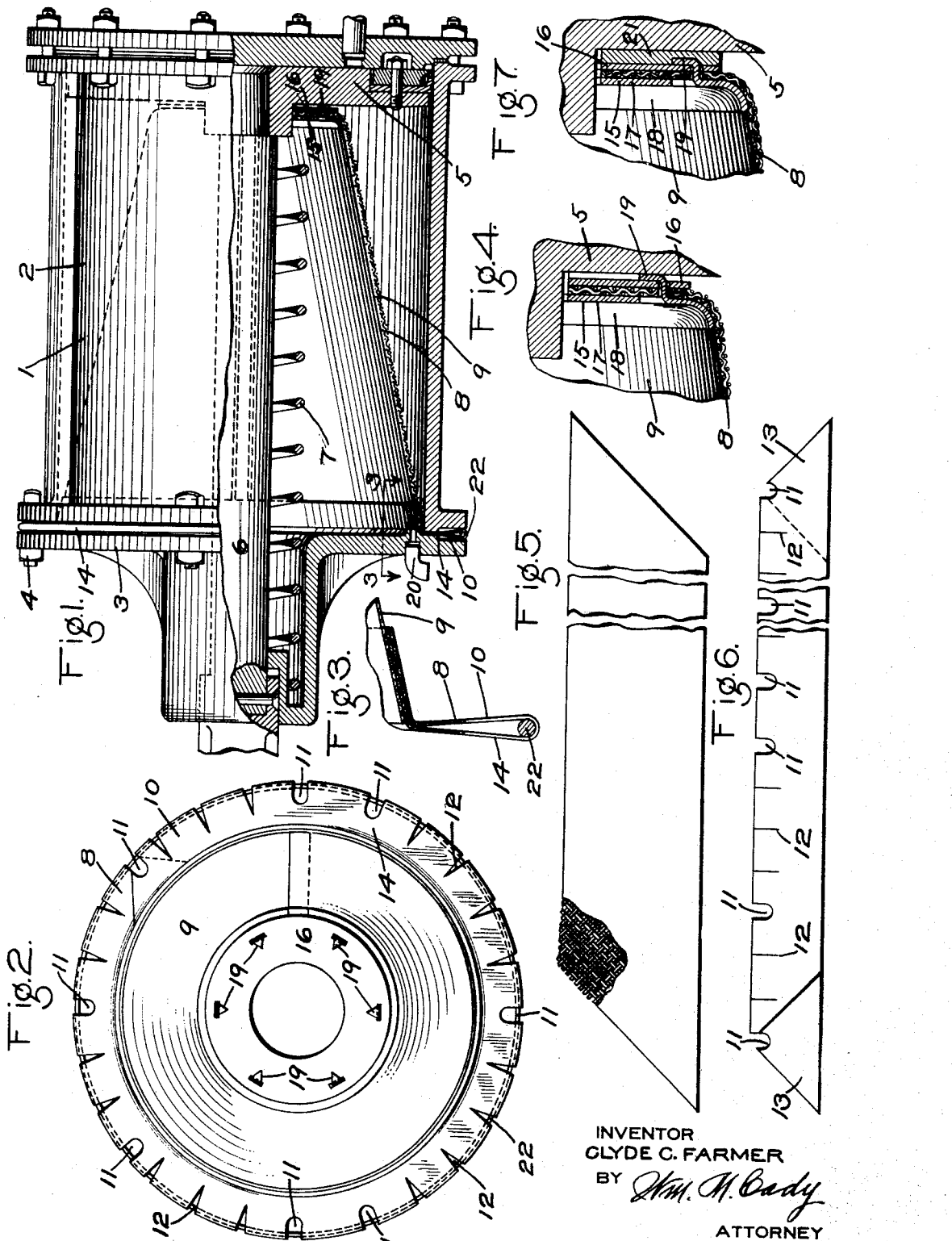
INVENTOR
CLYDE C. FARMER
BY Wm. M. Cady
ATTORNEY Patented Dec. 19, 1933

1,939,845

UNITED STATES PATENT OFFICE 1,939,845

BRAKE CYLINDER PROTECTOR

Clyde C. Farmer, Pittsburgh, Pa., assignor to The Westinghouse Air Brake Company, Wilmerding, Pa., a corporation of Pennsylvania Application November 9, 1928. Serial No. 318,138

5 Claims. (Cl. 303—88)

This invention relates to brake cylinders such as employed in railway rolling stock in connection with the fluid pressure brake system.

With the usual brake cylinder, trouble has been experienced, due to dirt and moisture collecting in the chamber at the non-pressure side of the brake cylinder piston, which dirt and moisture is carried into the chamber by the air flowing into the chamber around the loosely fitting piston rod.

Moisture thus carried into the brake cylinder collects on the inner wall of the cylinder and causes rusting, and in cold weather tends to freeze on said wall. Dirt or other foreign matter which may enter the brake cylinder acts as an abrasive and tends to unduly wear the brake cylinder piston packing.

The pincipal object of my invention is to provide novel means for preventing the accumulation of dirt and moisture on the walls of the brake cylinder.

Another object of my invention is to provide a collapsible filter element for use in brake cylinders which is pervious to air and impervious to matter foreign to air.

Another object of my invention is to provide a collapsible filter element for use in brake cylinders, which element is of simple construction, is efficient in operation and cheap to manufacture.

Other objects and advantages will appear from the following more detailed description of the invention.

In the accompanying drawing; Fig. 1 is a view of a brake cylinder, partly in section, showing my invention applied thereto; Fig. 2 is an end view of the filter element; Fig. 3 is a sectional view through a portion of the filter element taken on the line 3—3 of Fig. 1; Fig. 4 is an enlarged detail sectional view through the rear end portion of the filter element; Figs. 5 and 6 are detail views illustrating how the flange section of the filter is formed; and Fig. 7 is a sectional view similar to Fig. 4 but showing a slight modification of my invention.

In the drawing, a brake cylinder 1 is shown which is of the usual construction having a body portion 2 to which a non-pressure head 3 is secured by bolts 4. Contained in the body portion 2 is the usual piston 5 having a piston rod 6 which extends out through an opening in the non-pressure head 3. The piston 5 is acted upon by the usual release spring 7 which tends to urge the piston to its release position.

When the brake cylinder piston 5 moves toward release position, air from the atmosphere enters the piston chamber through the non-pressure head 3 around the loosely fitting piston rod 6, carrying with it foreign matter such as dirt and moisture, and for the purpose of preventing this foreign matter from passing to the interior wall of the brake cylinder, I provide, within the cylinder, a filter element 8 which is preferably in the form of a bag or bellows and may be made from any suitable material which will prevent the passage of dirt and moisture therethrough and yet permit the passage of air therethrough.

There are a number of suitable materials from which the filter element 8 may be made but I prefer to use a fabric such as duck, which I prefer to render waterproof by treating with a solution of beeswax or any other desired waterproofing solution which will prevent moisture from passing through the fabric but will not prevent the passage of air through the fabric.

The beeswax is dissolved in sufficient trichlor ethylene or any other suitable solvent to make a thin solution so that when the filter element is immersed therein the threads of the fabric become saturated with the solution. When the element is removed from the solution the solvent evaporates, leaving the wax. It will thus be seen that the fabric is impregnated with wax so that it will not become saturated with water when it is used in a brake cylinder. It has been found in practice that, when the fabric is thus treated, the air spaces between the threads of the fabric are not closed by the wax, so that the fabric, besides being waterproof, will permit the flow of air therethrough and at the same time will separate dirt and moisture from the air as it passes through the fabric.

The filter element 8 preferably comprises a body section 9 and a flange section 10. The body section 9 is made conical in form from a single piece of material, the ends of the material being overlapped and sewed or otherwise secured together longitudinally of the element. The flange section 10 may be made from the same kind of material as the body section is made of, and is preferably cut on the bias to prevent undue stretching of the material. I prefer to form this flange section from a single piece of material and to accomplish this, a piece of material is first cut to the shape as shown in Fig. 5 then folded upon itself as shown in Fig. 6, and then bolt openings 11 and slits 12 are cut in the turned edge of the material, the slits being for the purpose of permitting the flange section to be properly formed. The ends 13 of the material are now brought into overlapping relation with each other and are sewed or otherwise secured together. It will here be noted that the ends of the material, before it is folded upon itself, are cut at an angle, so that when the material is folded and the ends overlapped and secured together, there will be only two thicknesses of material at the seams.

The flange section 10 is now telescoped over the outer end of the body section 9 and sewed or otherwise secured thereto, after which the flange 14 is formed by turning the outer end portion of the flange section outwardly. To prevent undue sagging of the flange 14, a wire 22 is passed between the two layers of material at the fold, the ends of the wire being welded or otherwise connected together to form a ring.

The inner or small end of the element 8 is turned inwardly and is clamped between plates 15 and 16 which are preferably of metal. The plate 15 has a web 17 and an outwardly directed flange 18, which flange is curved in such a manner as to prevent the plate from cutting the material of the body section 9.

For the purpose of securing the plates together and to the body portion 1, projections 19 are struck out from the web 17 of the plate 15 which are adapted to extend through the material forming the body portion and through slots formed in the plate 16, which projections are bent over into locking engagement with the outside surface of the plate 16.

After the filter element 8 has been thus formed it may be immersed in the waterproofing solution.

The filter element 8 is now inserted in the brake cylinder, the non-pressure head 3 applied and the clamping bolts 4 inserted, so as to clamp the non-pressure head to the body portion 2 of the brake cylinder, with the flange 14 of the flange section 10 interposed therebetween.

With the filter element thus mounted in the brake cylinder, the release spring 7 engages the inner plate 15 and presses the plate 16 into close engagement with the face of the piston 2 on the non-pressure side of the piston.

Any dirt or moisture which may enter the brake cylinder through the non-pressure head 3 around the piston rod 6, collects in the filter element 8 and is thus prevented from being deposited on the cylinder wall of the brake cylinder.

Foreign matter which may accumulate within the filter element may drain out through a breather nozzle 20 having screw-threaded connection with the non-pressure head 4, the passage through said nozzle having communication with the interior of the filter element 8 and atmosphere.

It will be understood from the foregoing description that the filter element 8, whether it be waterproofed or not, is not intended to be air tight but is intended to prevent the passage of dirt and moisture therethrough to the interior wall of the brake cylinder. The filter element 8 is maintained porous to the flow of air for the purpose of preventing the build up of pressure in the space between the wall of the element and the interior wall of the brake cylinder, when the brake cylinder piston is moved to apply the brakes, since such build up of pressure would tend to rupture the element.

Instead of having the plate 16 of the filter element 8 seal against the non-pressure side of the piston 2 to prevent the passage of foreign matter to the interior wall of the brake cylinder, a washer 21 of felt or other desired material may be secured to the plate 16 as shown in Fig. 7 of the drawing, which washer will be pressed into close contact with the non-pressure side of the piston 2 and thus form a seal that will prevent the passage of foreign matter to the interior wall of the brake cylinder.

While two illustrative embodiments of the invention have been described in detail, it is not my intention to limit its scope to these embodiments or otherwise than by the terms of the appended claims.

Having now described my invention, what I claim as new and desire to secure by Letters Patent, is:—

1. A brake cylinder filter element comprising a collapsible bag like structure treated with a wax solution to render it impervious to dirt and moisture but not to air.

2. A brake cylinder filter element comprising a collapsible body section having an inturned end portion, a plate on each side of said inturned end portion, and integral projections on one of said plates extending through said portion and the other of said plates and adapted to be bent to secure said plates and inturned portion together.

3. A brake cylinder filter element comprising a collapsible body section having an inturned end portion, a plate on each side of said inturned end portion, and integral projections struck out from one of said plates adapted to be bent over the other of said plates for clamping said inturned end portion between said plates.

4. The combination with a brake cylinder having a non-pressure head and a piston mounted in said brake cylinder, of a collapsible filter element disposed in said cylinder between the non-pressure head and the piston, said element having an inturned portion at one end, a plate in said element engaging said inturned portion, a spring interposed between said non-pressure head and said plate and adapted to press the flange against the piston, and means for preventing the abrupt bending of said element in the vicinity of said plate when said element is extended to its fullest extent.

5. A brake cylinder protector comprising a collapsible bag-like structure of cloth impregnated with wax to render the cloth impervious to dirt and moisture but not to air.

CLYDE C. FARMER.